No. 768,582. PATENTED AUG. 30, 1904.
A. B. CALKINS.
MATCH MAKING MACHINERY.
APPLICATION FILED DEC. 8, 1900.
NO MODEL. 6 SHEETS—SHEET 1.

WITNESSES:
Harry A. Goss.
Harry S. Mant.

INVENTOR
Almon B. Calkins
BY
D. Howard Hayport
HIS ATTORNEY

No. 768,582. PATENTED AUG. 30, 1904.
A. B. CALKINS.
MATCH MAKING MACHINERY.
APPLICATION FILED DEC. 8, 1900.
NO MODEL. 6 SHEETS—SHEET 2.

WITNESSES:
Harry X. Goss,
Harry S. Marsh.

INVENTOR
Almon B. Calkins
BY
D. Howard Haypum
HIS ATTORNEY

No. 768,582. PATENTED AUG. 30, 1904.
A. B. CALKINS.
MATCH MAKING MACHINERY.
APPLICATION FILED DEC. 8, 1900.
NO MODEL. 6 SHEETS—SHEET 3.

WITNESSES: INVENTOR
Harry Goss Almon B. Calkins
Harry S. Marsh BY
D. Howard Hayford
HIS ATTORNEY No. 768,582. PATENTED AUG. 30, 1904.
A. B. CALKINS.
MATCH MAKING MACHINERY.
APPLICATION FILED DEC. 3, 1900.
NO MODEL. 6 SHEETS—SHEET 4.
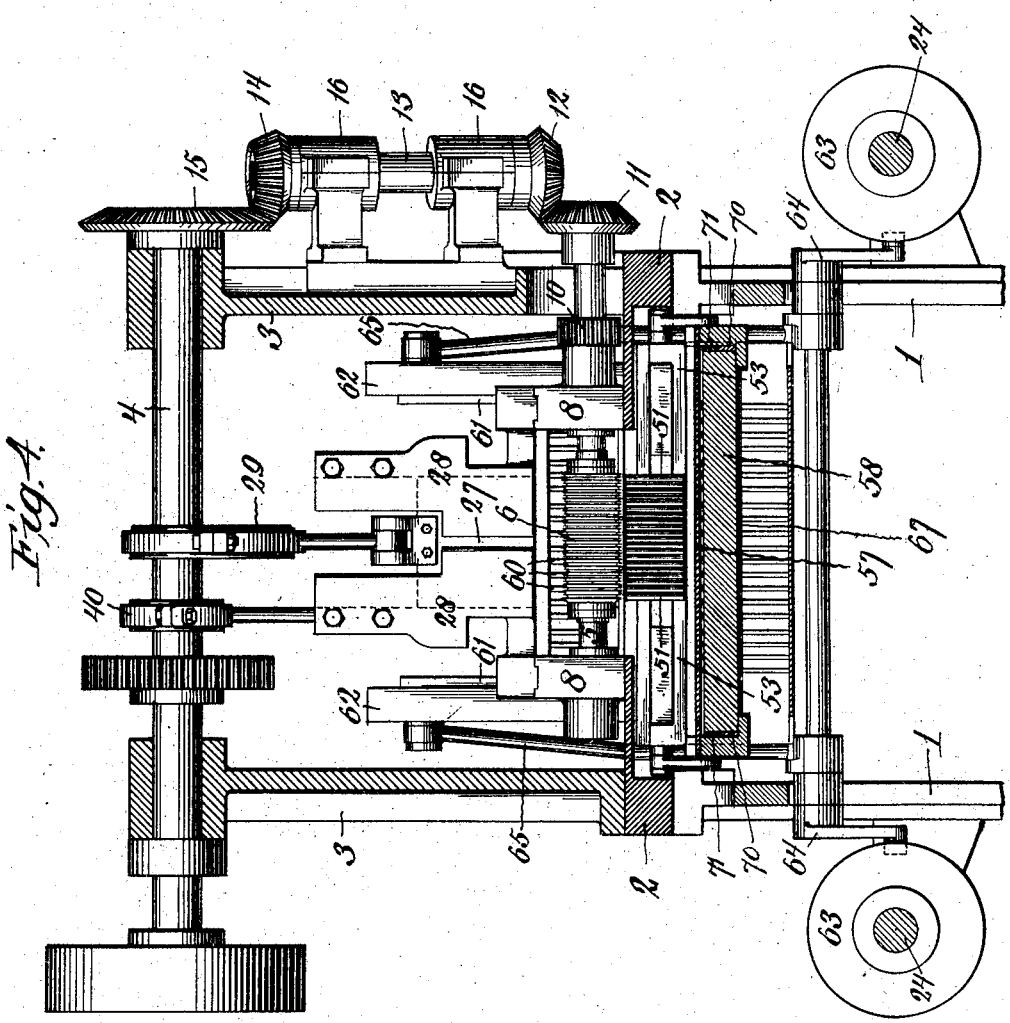

No. 768,582. PATENTED AUG. 30, 1904.
A. B. CALKINS.
MATCH MAKING MACHINERY.
APPLICATION FILED DEC. 8, 1900.
NO MODEL. 6 SHEETS—SHEET 5.
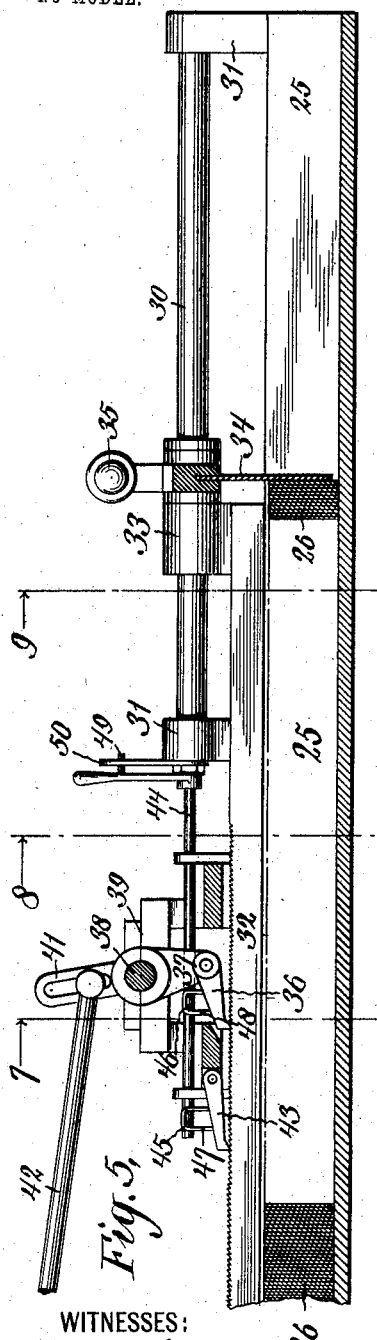
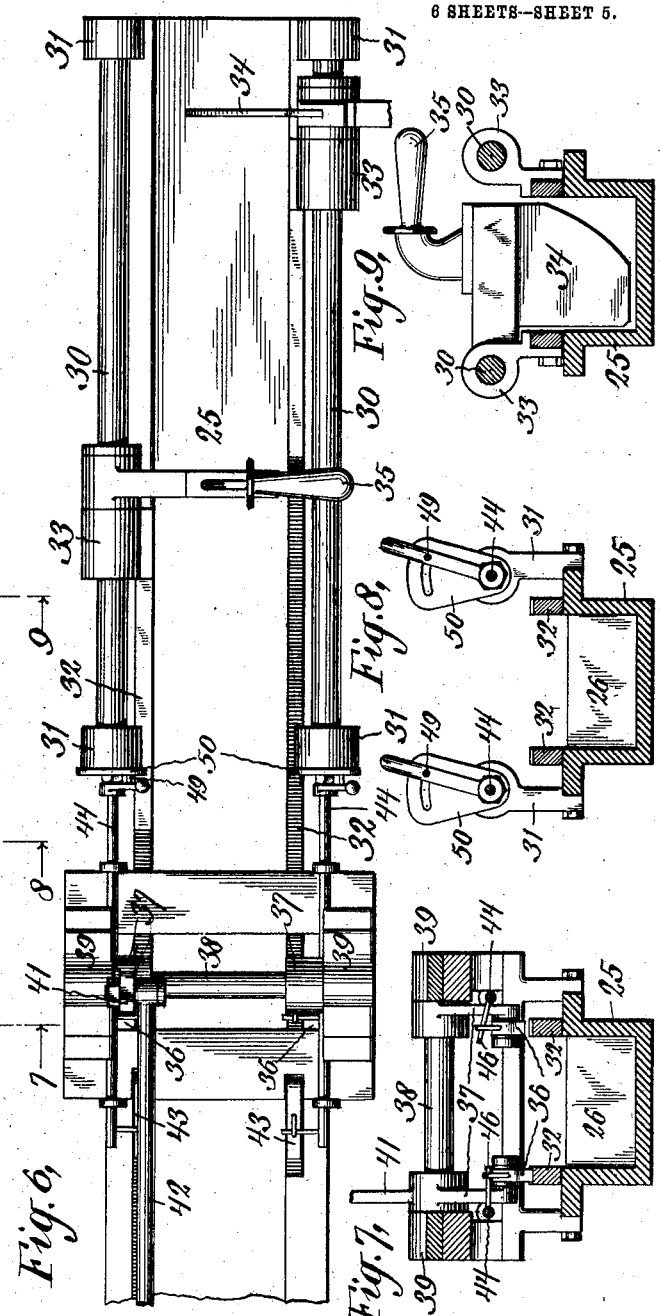
WITNESSES:
Harry A. Goss
Harry S. Marsh
INVENTOR
Almon B. Calkins
BY
D. Howard Haywood
HIS ATTORNEY

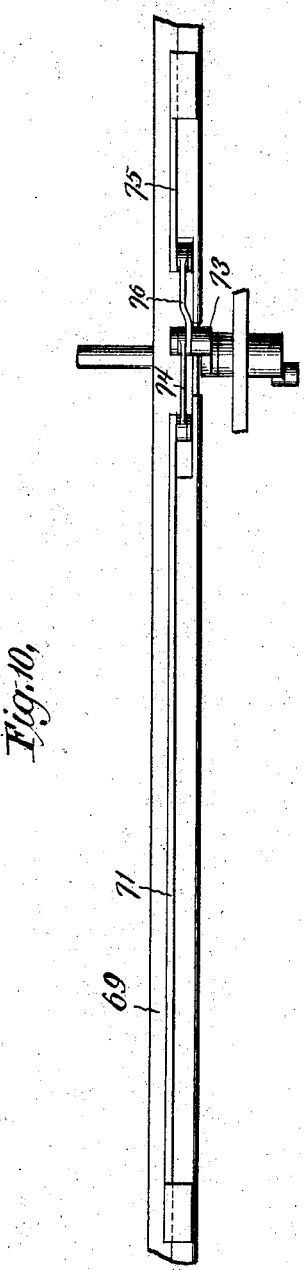
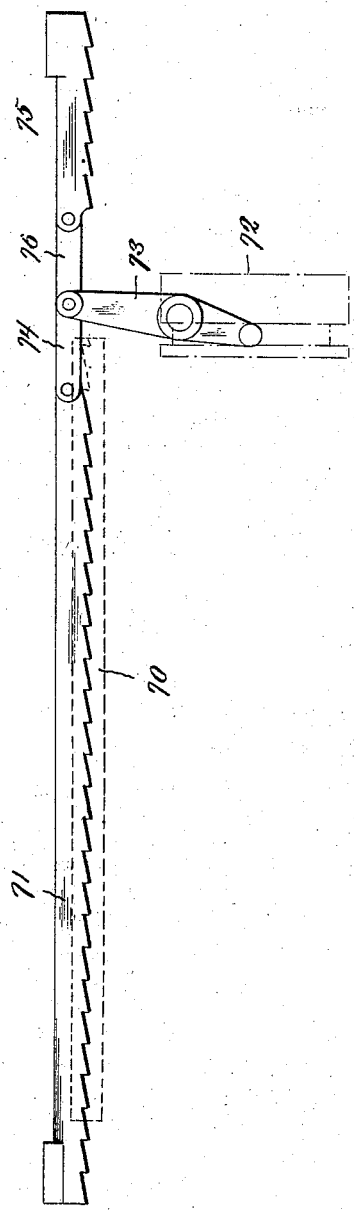

No. 768,582. Patented August 30, 1904.

UNITED STATES PATENT OFFICE.

ALMON B. CALKINS, OF FRANKLIN, NEW JERSEY, ASSIGNOR TO AMERICAN MATCH MACHINE COMPANY, OF NEW YORK, N. Y., A CORPORATION OF NEW JERSEY.

MATCH-MAKING MACHINERY.

SPECIFICATION forming part of Letters Patent No. 768,582, dated August 30, 1904.

Application filed December 8, 1900. Serial No. 39,198. (No model.)

*To all whom it may concern:*

Be it known that I, ALMON B. CALKINS, a citizen of the United States of America, and a resident of Franklin, in the county of Essex and State of New Jersey, have invented certain new and useful Improvements in Match-Making Machinery, of which the following is a specification, reference being had to the accompanying drawings, forming a part thereof.

My invention relates to match-making machinery, and particularly to mechanism for dividing veneer cards into splints and for receiving the splints and for presenting them in predetermined positions in suitable splint-carriers, in which they may be held and locked for purposes of further operation in converting the same into finished matches.

I will now proceed to describe a machine embodying my invention and will then point out the novel features in claims.

Figure 1:
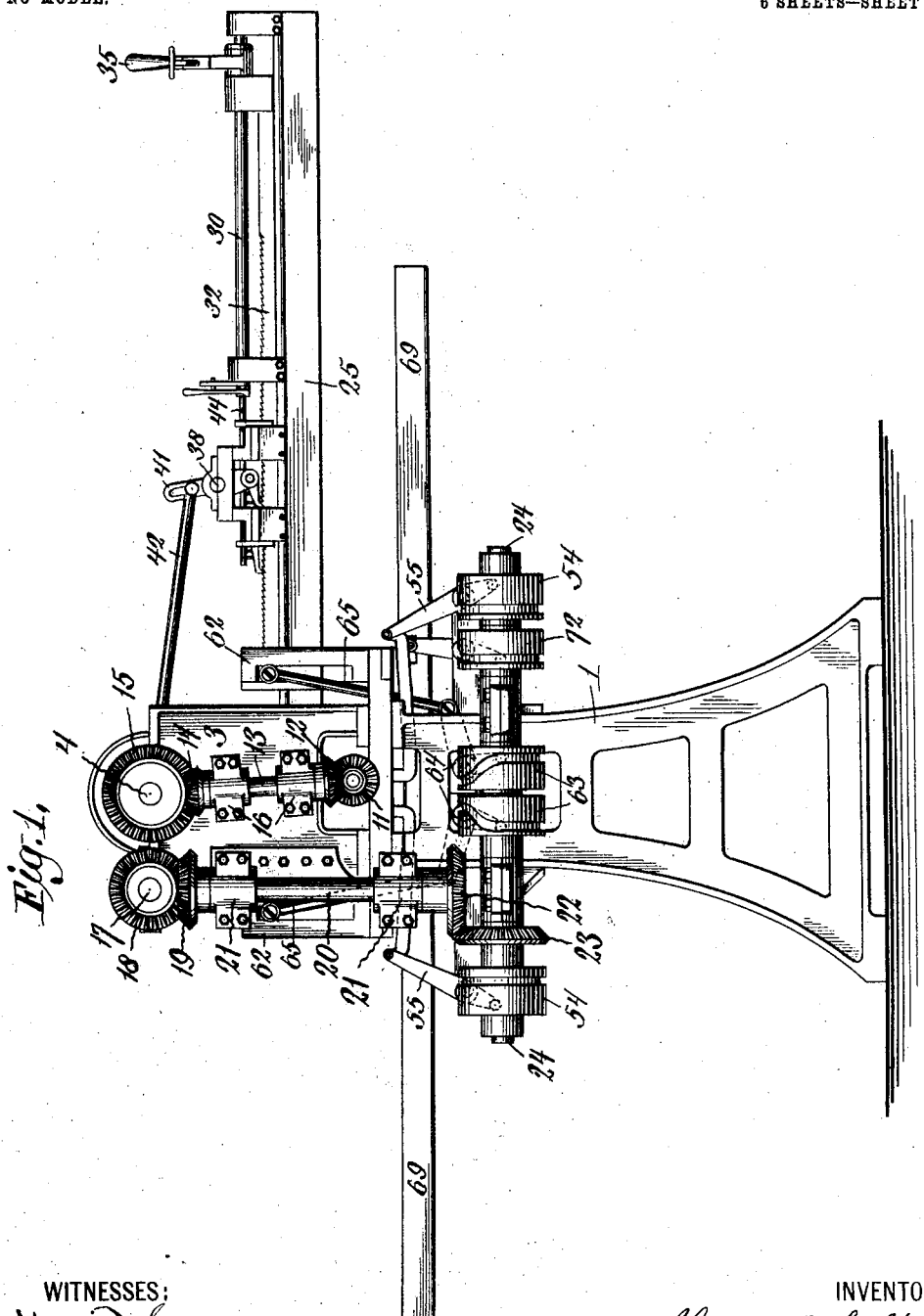
Figure 2:
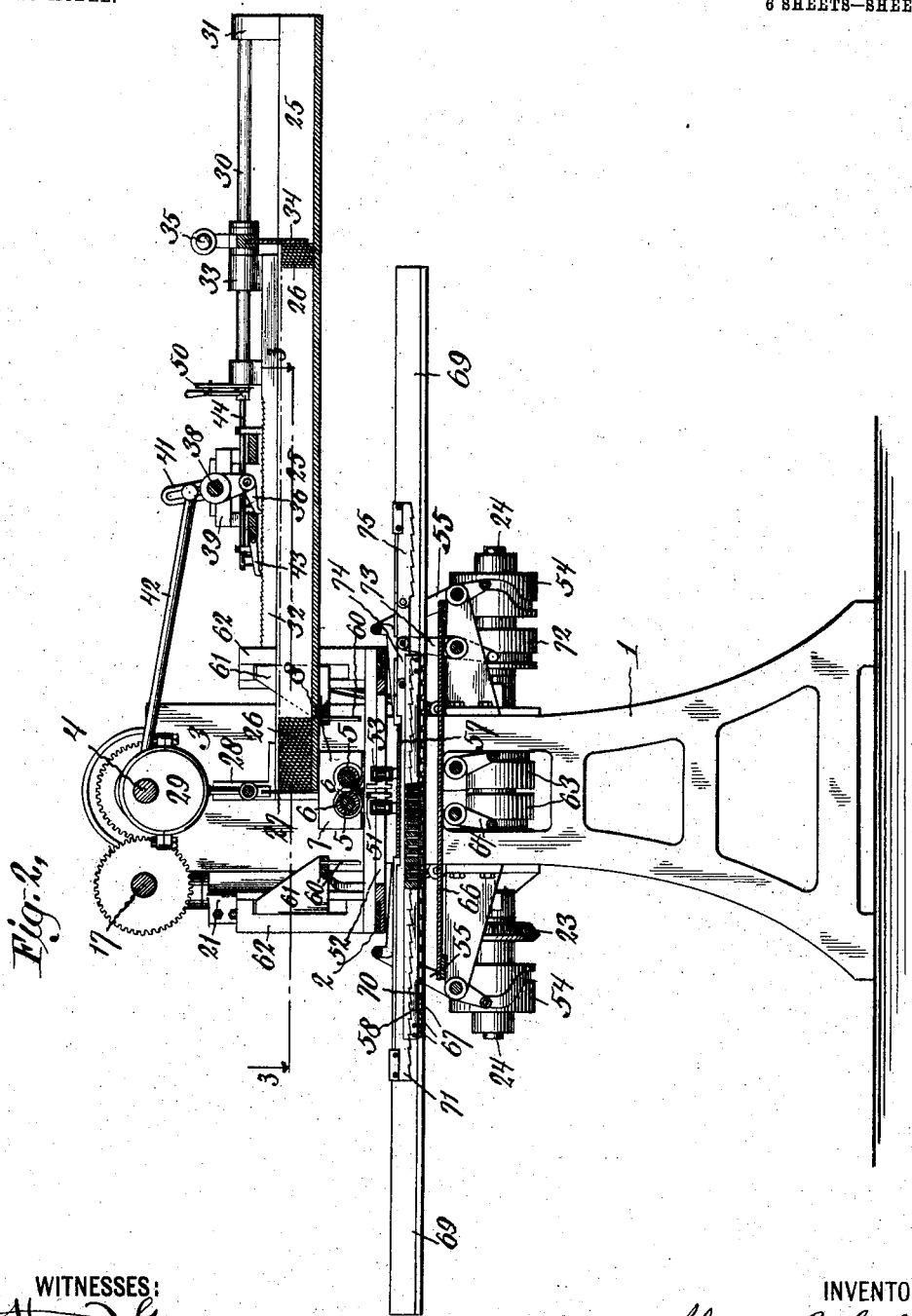
Figure 3:
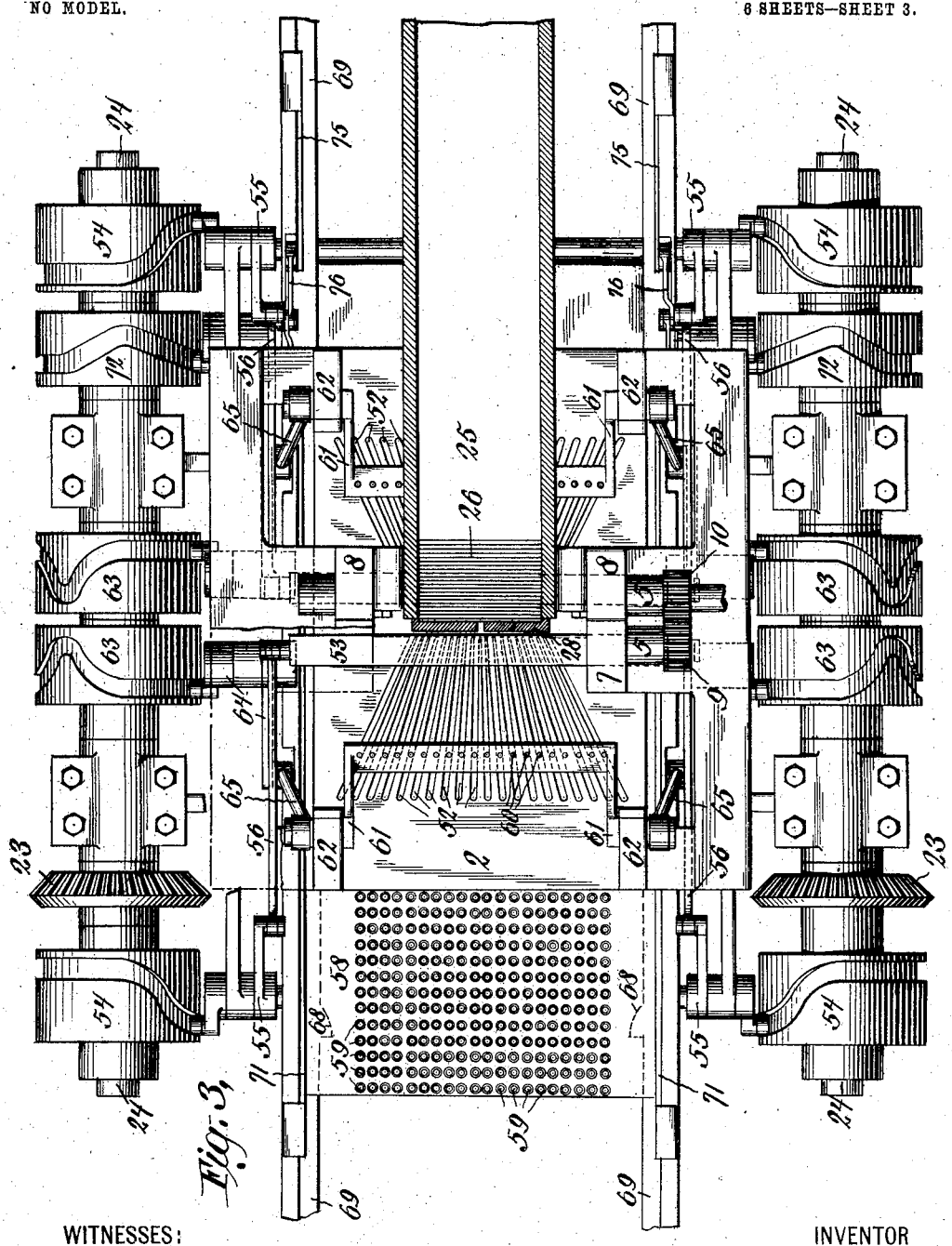

In the drawings, Figure 1 is a side elevation of a machine embodying my invention. Fig. 2 represents a central vertical section of the same, the plane of section being parallel with the view shown in Fig. 1. Fig. 3 represents a horizontal section, the plane of section being taken substantially on the line 3 3 of Fig. 2. Fig. 4 represents a central transverse vertical section, the plane of section being taken at right angles to that shown in Fig. 2. Fig. 5 represents an enlarged central longitudinal section of certain parts constituting the veneer-card feed. Fig. 6 is a top view of the same. Figs. 7, 8, and 9 represent, respectively, detail cross-sectional views of the same, the plane of sections being taken, respectively, on the lines 7 7, 8 8, and 9 9 of Fig. 5. Figs. 10 and 11 are detail views of certain splint-carrier feed mechanism.

For purposes of this specification I will describe a machine in detail with reference to the drawings herewith precisely as it is illustrated, it being understood, however, that the machine thus illustrated and described is but one form in which my invention may be carried out.

I wish it to be understood that I do not desire to limit myself to the details of construction and combination of parts herein shown and described, as the same may be obviously varied within wide limits without departing from the spirit and scope of my invention.

In the machine herein shown reference characters 1 1 designate side frames, and 2 a top plate or table supported thereby and which serves to connect the said frames together. 3 3 are upper extensions of the said frames 1, and in the top of the said extensions 3 3 is journaled a drive-shaft 4. A suitable drive-pulley is secured to the end of the drive-shaft 4, to which power may be applied, as through a belt. Shafts 5 5, supporting each a plurality of rotary cutters 6, having oppositely-arranged and overlapping circumferential cutting edges, are journaled in bearings 7 7, 8 8, secured upon the table 2. The cutters and the discharging mechanism in connection therewith are not set forth herein fully in detail, as they form no part of the invention sought to be claimed in this application, but themselves form a part of the copending application filed December 8, 1900, Serial No. 39,200. The shafts 5 5 are geared together by pinions 9 and 10 (shown more clearly in Fig. 3) and derive their power from a bevel gear-wheel 11, which is mounted upon one of the shafts 5. The bevel-gear 11 meshes with a bevel-gear 12, secured upon a slightly-oblique shaft 13, having a bevel-pinion 14 secured upon its upper end and which meshes with a bevel-gear 15, mounted upon the end of the drive-shaft 4. The oblique shaft 13 is mounted in suitable bearings 16, secured upon the side of the upper extension 3 upon the side frame 1. Journaled in the upper end of the extensions 3 of the side frames 1 is an intermediate shaft 17, parallel with the drive-shaft 4. The drive-shaft 4 carries a gear-wheel which meshes with a similar gear-wheel on the shaft 17 and through which the shaft 17 is driven. Secured to the intermediate shaft 17 are bevel-gears 18 18, one at each end thereof, and the said bevel-gears mesh with bevel-gears 19 19, carried one each upon the upper ends of two vertical shafts 20, journaled in bearings 21 in the extensions 3 of the side frames 1. The lower ends of the shafts 20 carry each a bevel-gear 22, which mesh with bevel-gears 23 23, secured upon cam-shafts 24 24. There are two such cam-shafts, one each of which is provided upon each side of the machine. One of the said vertical shafts 20, with its bevel-gears 19 and 22, is shown in Fig. 1 of the drawings, and it will be understood that a similar shaft is provided on the other side for the purpose of driving the cam-shaft on that side of the machine. The relationship of the two cam-shafts 24 is best shown in Fig. 3 of the drawings. The cam-shafts 24 carry each a set of cams to be hereinafter described and for the purposes to be hereinafter set forth.

A feed-trough 25 is provided for the purpose of receiving a plurality of veneer sections 26, or "veneer cards," as they are termed in the trade. These veneer cards are of a thickness corresponding to the width which it is desired that the match-splints shall finally have. When fed to the rotary cutters 6, they are adapted to be separated into a plurality of splints, each splint forming the base or stem of a finished match. For the purpose of feeding the veneer cards to the rotary cutters a plunger 27 is provided, which is mounted to reciprocate in ways 28. An eccentric 29, mounted upon the shaft 4, gives a reciprocating movement to the plunger 27. The veneer cards are fed up to the plunger by means which I will now proceed to describe, and I have provided such means in duplicate in order that a new batch of veneer cards may be inserted into the feed-trough and the feeding mechanism changed to include the new batch of veneer cards so inserted without interrupting the operation of the machine. Such mechanism is shown on an enlarged scale in Figs. 5, 6, 7, 8, and 9 of the drawings, and is as follows: On either side of the feed-trough 25 are secured stationary guide-rods 30, which are fixed in suitable brackets 31, secured to or forming an integral part of the feed-trough 25. Feed-racks 32 are provided, one each upon each side of the trough 25 and having each a lug 33, which surrounds and loosely engages the guide-rods 30. The racks 32 each carry a pusher or feed-plate 34, mounted upon lugs 33 to have rotary movement thereon, but which are held against relative movement endwise thereof. Each pusher-plate is provided with a handle 35, and by grasping the said handles either one of the pusher-plates 34 may be thrown out of or into the feed-trough 25. The feed-racks 32 are given a step-by-step movement by pawls 36 36, one each mounted on arms 37 37, mounted upon opposite ends of a rock-shaft 38. The said rock-shaft is journaled in bearings 39, fixed upon the sides of the feed-trough, and is caused to slightly rotate upon its axis intermittently in opposite directions by means of an eccentric 40, mounted upon the drive-shaft 4 and engaging with a lever 41, secured to the rock-shaft 38 through an eccentric-rod 42. Stop-pawls 43 are provided for each of the feed-racks 32. As thus far described reciprocation of the rock-shaft 38 will actuate both the feed-racks 32, and both pusher-plates 34 will be advanced. It is desired, however, that under normal conditions only one feed-rack shall be operated at a time. To this end I have provided two tripper-shafts 44 44, one upon each side of the rack of the feed-trough, the said tripper-shafts being provided with operating-handles. The said tripper-shafts are further provided with pins 45 and 46, which engage with staples 47 and 48 upon the stop-pawls 43 and feed-pawls 36, respectively. When a tripper-shaft 44 is in a position such as is shown in Fig. 5 of the drawings, the pawls controlled thereby will be free to be in engagement with their feed-rack. Should the tripper-shaft be rotated in one direction, however, the pawls 36 and 43 in engagement therewith will be lifted clear of their feed-rack 32 and though the feed-pawl 36 will still be moved backward and forward it will have no effect upon its feed-rack 32. By this means the feed-racks on either side of the feed-trough may be operated or disconnected, as desired. The operating-levers of the shafts 44 are preferably provided with limiting means, as stop-pins 49, which pass through slots in stop-plates 50, the ends of which slots limit the amount of movement which can be given to the operating-lever, and hence to the tripper-shaft 44. One of the pusher-plates 34 being in engagement with the back of a number of veneer cards 26, as shown in Figs. 2 and 5, the intermittent movement given to the pusher-plate 34 will be timed so as to feed the veneer cards 26 to the plunger 27, before described. When it is desired to add some more veneer cards to the trough, it is merely necessary to put a number in back of the pusher-plate 34 (which is very thin for this purpose) to throw the second pusher-plate 34 down into the feed-trough at the rear of the veneer cards thus later inserted to push the said pusher-plate and its feed-rack forward, so as to apply the right amount of pressure to the veneer cards in front thereof to operate the tripper-shaft controlling the pawls upon the side of the feed-trough at which is the said last-named feed-rack and then to throw the said first-mentioned pusher-plate out of the trough by rotating it upon its supporting-lug, as before described. Lastly, the stop and feed pawls upon that side of the feed-trough at which the pusher-plate has been so thrown out may be disengaged, and the veneer cards will continue to be fed without interruption. The veneer cards when presented to the rotary cutters 6 will be divided thereby into a plurality of splints. These splints by reason of the construction of the cutters and their correlated parts will divide into two parallel lines, each successive splint being alternately discharged in opposite directions. The splints will be delivered to separable receivers 51, there being a receiver for each splint. The receivers 51 are arranged in two parallel lines and are mounted in divergent guideways 52, formed in the top plate or table 2. As a matter of construction the portion of the plate or table 2 carrying the divergent guideways is a separate part; but it is secured to the other parts forming the said table, and hence is treated as one part therewith. Carriages 53, of which there are two, one for each line of receivers, engage the said receivers and when moved outwardly in opposite directions carry the receivers with them. At the same time, however, they permit a separation of the said receivers, such separation being caused by their engagement with the divergent guideways 52. The receivers are operated by cams 54, mounted upon the cam-shafts 24. The said cams engage with operating-levers 55, connected to the said lugs 53 by means of links 56. A plate 57 is arranged beneath the receivers 51, the said plate preventing the splints from passing clear out of the receivers until such time as it shall be desired that they shall do so.

The separable receivers and means for separating them are described fully and claimed in a copending application, filed December 8, 1900, Serial No. 39,199, and hence further detailed description and illustration of the same herein is unnecessary. In the present case the receivers in each set are shown as adapted to be separated; but such separability is not essential, and I do not limit myself thereto. Hence they are claimed herein broadly as "receivers" or "reciprocating receivers," the claims covering the separable feature being all included in the copending application before referred to. The reciprocation of these receivers permits the positive movement of the splints through the machine without depending at any time upon gravity for any movement of the said splints, and such reciprocation of the receivers gives certain structural advantages in the machine, as will be obvious.

Beneath the receivers 51 and the plate 57 I arrange splint-carrying devices consisting of frames 58, having therein a plurality of match-splint-receiving openings 59 and having also means for locking the splints therein after they have been so received. The locking means and the details of the carrier-frames are clearly shown, described, and claimed in the copending application of Arthur N. Calkins, filed December 8, 1900, Serial No. 39,212, and further description and illustration thereof herein is unnecessary.

When the splints, into which the veneer cards have been divided by the rotary cutters, have been received by the receivers 51, the said receivers will be moved outwardly until they come to a point where they are directly beneath a plurality of plungers 60. Said plungers are carried by reciprocating plunger-bars 61, mounted to reciprocate in guides 62, secured upon the top plate or table 2. The plungers are operated by cams 63, mounted upon the cam-shafts 24 and which engage bell-crank levers 64, connected to the plunger-bars 61 by connecting-links 65 for such purpose. The cams 63 are so timed as to cause a downward movement of the bars 61 and the plungers carried thereby at the moment the receivers 57 are beneath them. This reciprocation of the plungers will positively force the match-splints out of the receivers into the carriers, and by such means the uncertainty arising from depending upon gravity for such movement will be eliminated. It will be noted that the width of the plate 57 is such as to permit the desired movement of the splints from the splint-receivers into the carriers only at such times as the said receivers are opposite the plungers 60. The plungers are rapidly moved downwardly again, and the cams 54 are so timed as to move the receivers back to their positions in which they are shown in Fig. 2 immediately the plungers 60 are moved out of engagement therewith.

A plate 66 is arranged beneath the path of the splint-carrying frames 58 and serves to prevent the splints from dropping clear through the said frames until they have been securely locked in position therein. The locking mechanism, which is described more fully in detail in a copending application, comprises a plurality of locking bars or plates 67, arranged in pairs and secured to the frames 58, and as the said frames are moved forwardly by mechanism to be presently described the locking-plates are forced inwardly to perform their function of locking the splints by cams 68, as will be seen more clearly by reference to Fig. 3 of the drawings.

In operating the machine I provide a number of frames similar to the frame 58 shown herein, which I arrange shall travel in guides 69, arranged upon opposite sides of the machine. Suitable means is supplied for giving them an intermittent feed or step-by-step movement forward. Such means consists in providing the sides of the carrier-frames with bars 70, having rack-teeth, and in providing feed-racks 71, which are adapted to engage with the teeth of the bars 70. The said feed-racks 71 are given a reciprocating movement by cams 72, mounted upon the cam-shafts 24 and which engage with levers 73, secured to the said feed-rack 71 by links 74 for such purpose. The cams 72 are timed so as to cause a step-by-step movement forward of the carrier-frames after they have received two rows of splints from the splint-receivers 51 to a position in which they are ready to receive another two rows. The operation of the carrier-frame feeding mechanism will be more fully understood by reference to Figs.

10 and 11, in which they are shown in detail. The feed-rack 71 is maintained in engagement with the teeth of the bar 70 upon the side of the match-carrier frame by gravity. Springs, of course, may be employed, if desired.

In addition to the main feed-bar 71 I have provided auxiliary feed-bars 75, which are connected to the operating-levers 73 by links 76. The auxiliary feed-bars 75 permit a new match-carrier frame to be readily inserted and to be pushed forward, so that it will butt against the frame in advance and will be fed together with it by the said auxiliary feed-bars until it is finally engaged by the main feed-bars. In this manner I am enabled to obtain a continuous operation of the machine without intermission for so long as I feed carrier-frames to the said feed mechanism and supply veneer cards to the veneer-card-feed trough.

It will be understood that in first starting up the machine it will be necessary to push a carrier-frame in the machine to such an extent that splints will be received thereby from the receivers which have been moved to a position beneath the most forward plungers 60. The step-by-step forward movement of the carrier-frames is equal to a distance of two rows of splint-receiving openings therein, and hence the first few alternate rows of the first frame supplied will be empty. After the said carrier-frame has been moved a distance equal to between the two sets of plungers 60 the alternate rows of openings will have been filled up with splints from the receivers beneath the rearward plungers, and thus all the rows after the first few rows have passed will be filled. The successive frames being fed forward continuously, the following frame acts as if it were in one piece with the frame preceding it. Hence it will only be in the first starting up of the machine that a few of the splint-receiving openings will fail to receive splints.

It will be noted that in this machine the splints are always under positive control and that every movement of the same throughout the machine is positively forced and dependent in no instance upon gravity. It will also be noted that after the veneer cards have been divided into splints each splint is taken hold of separately and is separately moved throughout the machine. The splints are dependent for their movement in no respect upon the movement of any other splint.

What I claim is—

1. In match-making machinery, the combination with veneer-card-cutting mechanism, of a feed-trough for the veneer cards, two feed-racks for feeding the cards in said feed-trough to said cutting mechanism, a feed-plate rotatably mounted upon each of the said feed-racks, but secured against relative endwise movement thereon, and operating means for the said feed-racks.

2. In match-making machinery, the combination with veneer-card-cutting mechanism, of a feed-trough for the veneer cards, two feed-racks for feeding the cards in said feed-trough to said cutting mechanism, a feed-plate rotatably mounted upon each of the said feed-racks, but secured against relative endwise movement thereon, and means for independently operating either or both of the said feed-racks.

3. In match-making machinery, the combination with veneer-card-cutting mechanism, of a feed-trough for the veneer cards, a stationary guide-rod on either side of the feed-trough, two feed-racks each having a lug which surrounds and loosely engages one each of the said guide-rods, two pusher or feed plates, each rotatably mounted on the lug of one each of the said feed-racks, feed-pawls for the said racks, and means for disengaging either or both of the said feed-pawls from their respective feed-racks.

4. In match-making machinery, the combination with veneer-card-cutting mechanism, of a feed-trough for the veneer cards, a stationary guide-rod 30 on either side of the feed-trough, two feed-racks 32, each having a lug 33 in loose engagement with said guide-rods, two pusher or feed plates 34 rotatably mounted upon the lugs 33, a transverse rock-shaft 38, feed-pawls 36 carried thereby and tripper-shafts for disengaging either or both of the said feed-pawls 36 from their respective racks.

5. In match-making machinery, the combination with veneer-card-cutting mechanism, of a feed-trough for the veneer cards, two feed-racks arranged one each on either side of the feed-trough, a transverse rock-shaft having feed-pawls adapted to engage the said feed-racks, tripper-shafts having a connection with the said feed-pawls whereby upon the operation of the said shafts either or both of the said pawls may be disengaged from their respective racks.

6. In match-making machinery, the combination with veneer-card-cutting mechanism, of a feed-trough for the veneer cards, two feed-racks arranged one each on either side of the feed-trough, a rock-shaft having feed-pawls adapted to engage the said feed-racks, two rotatably-mounted tripper-shafts 44, each having an operating-handle, and each having a pin 46 in engagement with staples 48 upon the feed-pawls.

ALMON B. CALKINS.

Witnesses:
WILLIAM R. SWETT,
J. ARTHUR HOOKEY.